May 5, 1942.  A. F. ECKEL  2,281,565

SIGN AND REFLECTOR THEREFOR

Filed Feb. 5, 1938  3 Sheets-Sheet 1

Inventor
Arthur F. Eckel
By Kent W. Wonnell
Atty.

Fig. 10.ᵃ

Inventor
Arthur F. Eckel
By Kent W. Worrell
Atty.

May 5, 1942.                A. F. ECKEL                 2,281,565
                    SIGN AND REFLECTOR THEREFOR
                    Filed Feb. 5, 1938         3 Sheets-Sheet 3

Inventor
Arthur F. Eckel
By Kent W. Wormell
           Atty.

Patented May 5, 1942

2,281,565

UNITED STATES PATENT OFFICE 2,281,565

SIGN AND REFLECTOR THEREFOR

Arthur F. Eckel, Chicago, Ill.

Application February 5, 1938, Serial No. 188,899

6 Claims. (Cl. 88—73)

This invention relates in general to a display sign or reflector and has more particular reference to that type of signs in which the illumination of the sign is from the lights of an automobile providing a collinear reflector which has the brilliance and effect of a separately illuminated sign when it is illuminated.

Among the objects of the invention are to provide a sign of this kind made up of a plurality of collinear reflecting units; to produce a colored sign by applying a coating or a mask of coloring or opaque material to a sign made up of units; to protect a sign of this kind by a transparent plate of glass or the like; to produce a sign or picture by a film of coloring material interposed between the protector plate and the reflector units; to color the individual reflector units by transparent or opaque paints or films applied to the back or front thereof and thus to produce a variety of colored signs, displays, or advertising pictures; to provide a sign composed of collinear reflecting units having a system of dihedral grooving at the back which eliminates the necessity for a silvered or mirrored surface at the back; to provide a novel system of dihedral grooving for individual projections at the back of a collinear reflecting unit of this kind; to improve the reflection of the collinear unit projections by forming these individual projections with dihedral grooves at the sides, back, or in a recess at the back located in the focal plane or the focal surface of the projection itself so that practically a total reflection and refraction of all the light rays entering the unit is effected; and in general to produce the reflector units and signs as herein shown and described.

In the accompanying drawings illustrating preferred embodiments of the invention, Fig. 1 is a view in elevation of a sign in accordance with this invention composed of square reflector units which are colored or masked to produce any desired figure or character, each unit being represented as clear or of a solid color;

Fig. 2 is a sectional view of the sign shown in Fig. 1 illustrating a protecting front glass plate and a masking film interposed between the reflecting units and the plate;

Fig. 2ᵃ is a sectional view of a portion of a sign in which two reflector units are turned oppositely with a coloring film or material between them and one of the reflector units having reflecting projections for making up a particular design or outline;

Figure 10:
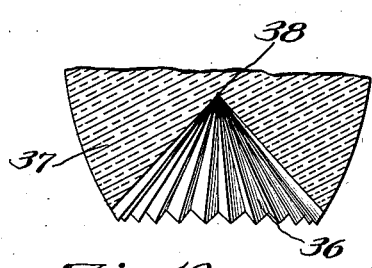
Fig. 10 illustrates a reflector projection with an internal right angular conical recess having dihedral grooves.
Figure 12:
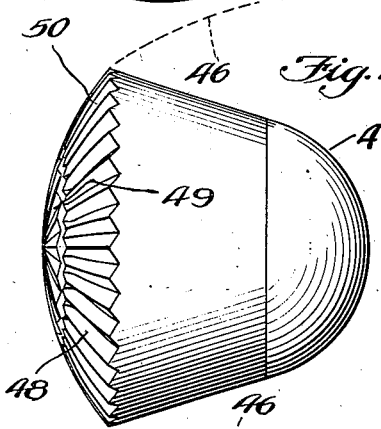
Figure 11:
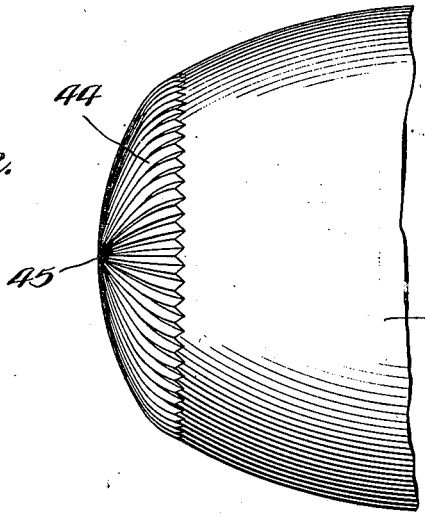
Figure 13:
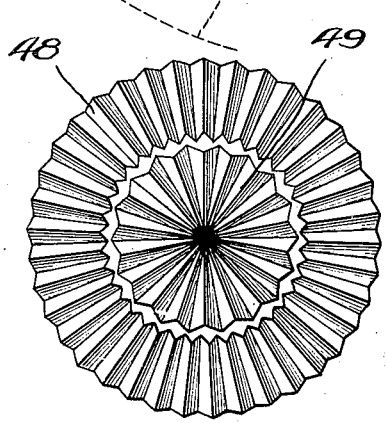
Figure 14:
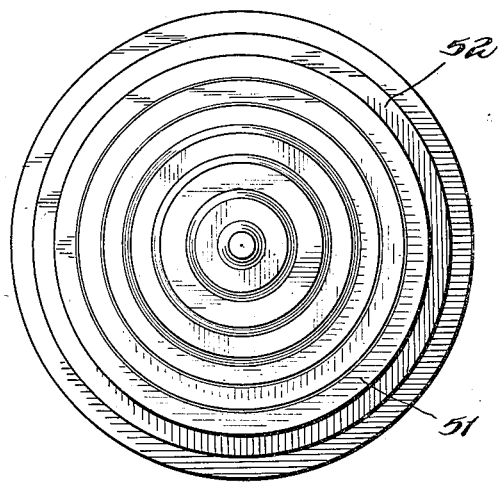
Figure 16:
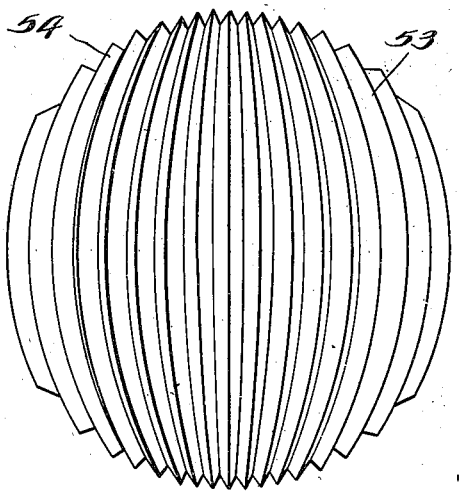
Figure 15:
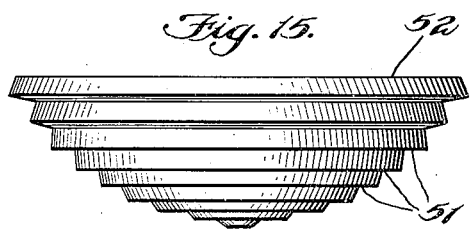
Figure 17:
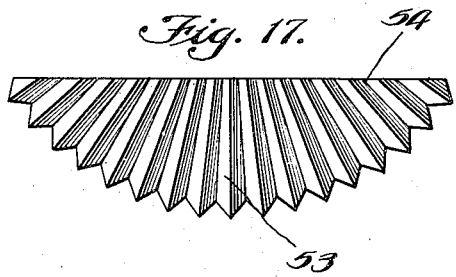
Figure 18:
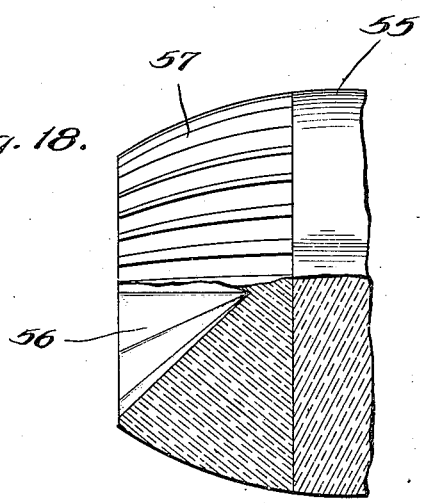

Fig. 10ᵃ is a perspective of a portion of a dihedrally grooved rib which may be provided on the reflector units instead of individual projections;

Fig. 11 illustrates a reflecting unit projection with a curved focal surface having dihedral grooves;

Fig. 12 shows a reflector button having a curved reflector surface of two different dihedral groovings;

Fig. 13 is a front view of a portion of the surfaces shown in Fig. 12 with different dihedral groovings;

Figs. 14 and 15 are face and side views respectively of a reflector unit projection with concentric dihedral grooving;

Figs. 16 and 17 are face and side views respectively of a reflector projection having transverse curved dihedral grooves; and Fig. 18 illustrates a reflector unit projection with a lateral surface formed with dihedral grooves and with an internal right angled pyramidal recess.

According to this invention a reflecting sign may be made up of a number of collinear reflecting units, usually of square, rectangular or similar regular shapes which fit easily and closely together. Each of the units has a plurality of projections at its rear or reflecting side in which the focal plane or focal surface is preferably provided with a system of dihedral grooving which makes it unnecessary to coat any part of the unit with silver or any other mirror producing material. This makes it possible to paint the backs of these reflecting units with any desired color, or to tint the glass itself with a color. It is also possible to coat the front surface of the units with paint or a coloring medium such as a film of transparent colored material, or to provide a mask of transparent colored or opaque material positioned in front of the reflecting units so that a colored sign consisting of letters or characters, pictures, or other display material may be produced in which the reflecting units or portions of them will stand out clearly when illuminated by lights, particularly the lights of an automobile. This construction is particularly designed and intended for roadside signs, either for warning or display purposes, but of course may have a more general use wherever applicable.

When the outer surface of the reflecting units is painted or coated with a coloring material or provided with a mask or film through which the units appear it is desirable to place a protector plate, usually of glass, in front of the sign which will in no way interfere with the reflecting properties of the sign but will form a weathering protector and also if the protector plate is opaque to the passage of ultra-violet light, it will prevent the fading of many types of paint and coloring films which are applied to the reflecting units.

Figure 1:
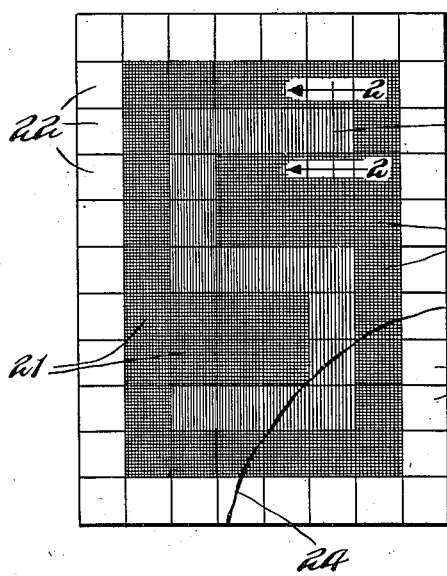

Referring now more particularly to the drawings, a collinear reflecting sign is shown in Fig. 1 as made up of square reflecting units assembled closely together to form a substantially continuous reflecting sign. In this sign a number of reflecting units 20 indicated as colored red, are assembled to make up a letter S. Surrounding and enclosing the letter thus formed are a plurality of units 21 indicated as colored black, which make the letter S stand out clearly whether the sign is directly illuminated by the lights of an automobile or whether it simply stands out in the open. There may also be an outer marginal row of reflecting units 22 which may be colored a contrasting color or they may be left clear and uncolored so that they will brightly reflect any light whether from an automobile or any other illuminating means.

Figure 2:
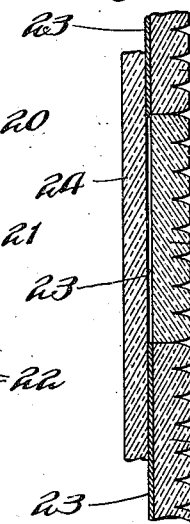
Figure 2A:
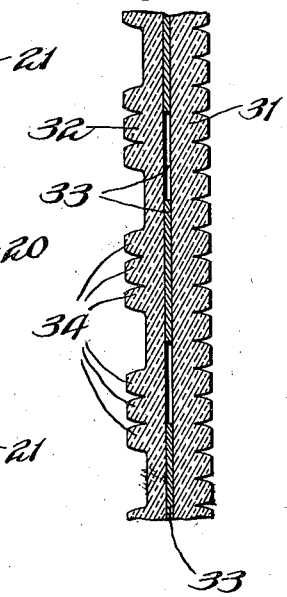

A sign as shown in Fig. 1 may have the units colored by painting them on either side, by coloring the glass itself, or by introducing a mask or film 23 of coloring or opaque material between the outer faces of the reflecting units and a covering protector plate 24 of plate glass or the like as indicated more clearly in Fig. 2.

Figure 3:
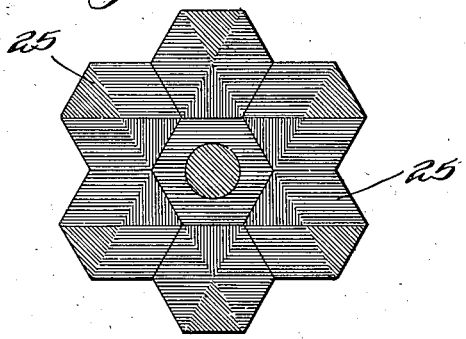
Fig. 3 illustrates a colored sign made up of hexagonal reflector units, different colors appearing on each of the units.

Instead of producing letters, characters or designs by arranging the reflecting units as in Fig. 1, each of the reflecting units may be variously colored in whole or in part as represented by the hexagonal units 25 as shown in Fig. 3, these different colorings making up a design, a picture, or any desired display material and either provided with a film or mask as shown in Fig. 2 or with a protecting glass plate 24, depending upon the application and use of the sign or display.

Figure 4:
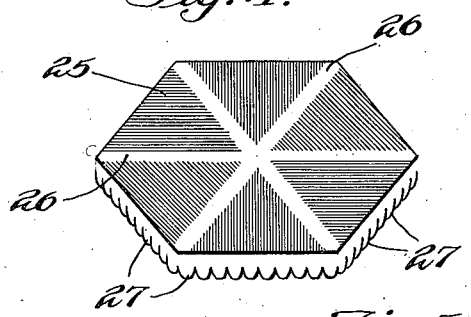
Fig. 4 is a perspective of the front of a hexogonal reflector unit in which different colors are painted or films of color are attached to the front surface.

A face view of one of the reflecting units is shown in Fig. 4 in which the smooth outer surface is represented as painted or coated with films of paint or coloring material of different colors separated by lines 26 which are left clear so that they will reflect the light without any color.

Figure 5:
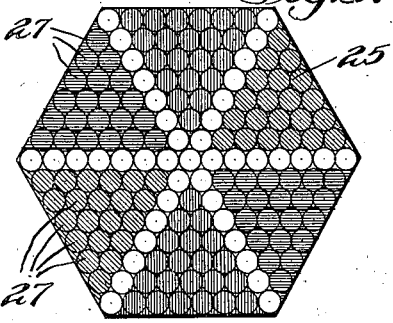
Fig. 5 illustrates a similar unit with the back surfaces painted or otherwise colored to reflect the corresponding colors.

These particular units are formed with projections 27 at their rear or reflecting side and it may be desirable, in order to produce different colors or designs, to coat this rear side with different colors indicated as red, green and blue in Fig. 5, leaving certain of the projections uncolored to produce a clear or crystal effect, if desired.

Figure 6:
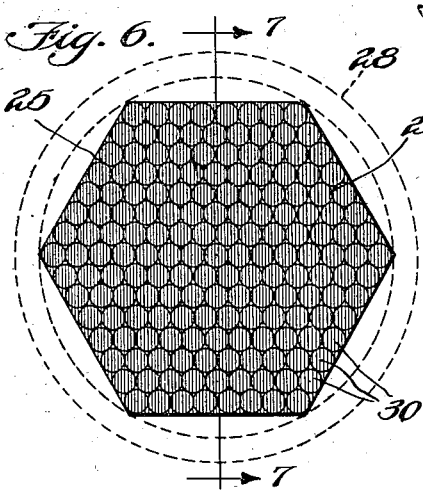
Fig. 6 is a face view of a hexagonal unit showing its relation to a circular plate and represented as made of colored glass or reflecting material.
Figure 7:
Fig. 7 is a section taken on the line 7—7 of Fig. 6.

In producing hexagonal reflecting units, or units of other shapes, it may be desirable as shown in Figs. 6 and 7, first to form a circular or other shaped member having a projecting rim or flange 28 with an outer plane surface 29 and reflecting projections 30, and then to trim or cut off the outer edge or flange, leaving the inner part of hexagonal, square or other desired or regular shapes. Furthermore instead of being clear glass or other reflecting material, the glass itself may be colored or tinted which will produce a desired tint or color in the completed sign or reflector unit. In making circular or other reflector units, the outer plane surface as 29, may be curved outwardly and the opposite or inner surface may be correspondingly curved and included within the line of the flange 28. Thus a unit with a flange of this kind may be separately mounted or if the flange is cut off the hexagonal or other regular unit may be combined with other units to form a composite or complete sign.

It is also contemplated as shown in Fig. 2ª that reflector units 31 and refracting units 32 may be placed with their projections oppositely aligned and with a colored coating, film or mask 33 disposed between them. The refracting units may have projections 34 on the outer face corresponding to the cut-out or other portions of the mask 33, these projections 34 themselves forming a figure or design which if placed outermost will modify the reflection to that extent when a reflector or sign of this kind is set up for illumination by an automobile lamp or other illuminating means. Various combinations of projections, reflectors, color screens, and the masking films may thus be employed to produce a great variety of signs, pictures, displays, and the like.

Figure 8:
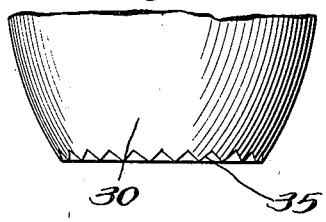
Fig. 8 is an enlarged view of one of the reflector projections at the back of a reflector unit showing radiating dihedral grooves.
Figure 9:
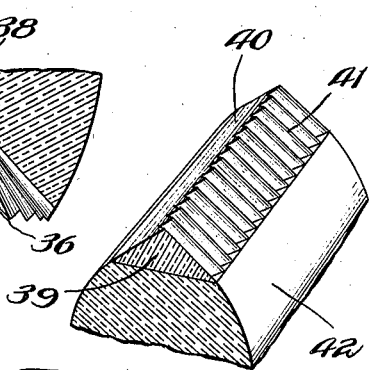
Fig. 9 is a face view of the projection of Fig. 8 showing the dihedral grooves.
Figure 9:
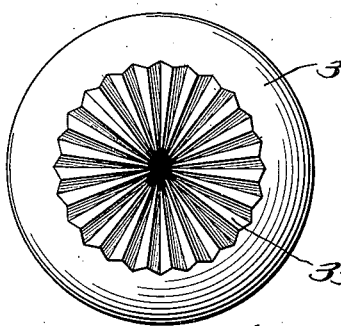

In order to make the reflector units most effective the projection surface 30 at the rear thereof is preferably rounded or curved to conform to a focal reflecting surface optically aligned with a corresponding parabolic or cartesian oval refracting front surface which may be truncated at the focal plane or focal surface and in the form illustrated by Fig. 8, a grooved dihedral surface 35 is represented as located in the focal plane with the dihedral grooves radiating from the center thereof as indicated more clearly in Fig. 9. This system of dihedral grooving may comprise angular planes at forty-five degrees or ninety degrees apart to produce the best reflection without the addition of any mirror coating.

Instead of the dihedral grooving being located entirely in a plane, a conical system of dihedral grooving 36 as shown in Fig. 10 may be applied to projections 37, the conical depression forming an paex 38 of substantially ninety degrees to provide the best results.

If it is desired to make a straight or continuous rib of reflecting material instead of the single projections, a rib 39 of reflecting or refracting material may have a plane surface 40 on one side and a system of parallel dihedral grooving 41 at ninety degrees to the plane surface. This projection or rib may be separate with a plane frame surface or it may be an extension at the extremity of a projection 42 which may be parabolic in cross section except for the angular dihedral rib 39 which forms the reflector therefor. If desired various designs or outlines can be formed in the reflector by means of projecting ribs of this kind.

Instead of cutting the projections in a focal plane or focal surface as above described, these projections as 43 in Fig. 11, may have a system of dihedral grooving 44 extending radially from the center of the rounded projection 45 and covering the extremity of the projection on all sides for a distance up to the plane including the focus or latus rectum, if the projection is a paraboloid, and substantially to the same extent for other curved or oval reflecting and refracting projections.

In the system of dihedral grooving as shown in Figs. 12 and 13, a rounded or curved projection as indicated by the broken lines 46 at the top and bottom, or a button type reflector 47, may have a curved reflecting and refracting surface 48 with two systems of dihedrally grooved surfaces, one 49 at the center of the projection, and a surrounding ring 50 at the outside of the center. These two systems of groovings, preferably radiating from the center, may be both with forty-five degree or ninety degree dihedral angles, or one may be at forty-five degrees and the other may be at ninety degrees.

Another system of dihedral grooving as shown in Figs. 14 and 15 consists in a series of concentric dihedral ribs 51 extending from the center of each reflecting projection 52 in increasing circles until the desired portion of the extremity is covered.

A still different system of dihedral grooving is illustrated in Figs. 16 and 17 comprising dihedral ribs 53 or strips extending diametrically across a projection 54 at the center and rounded downwardly therefrom at the sides.

In the system of dihedral grooving shown in Fig. 18 a truncate reflecting and refracting projection 55 has an inwardly turned recess 56 forming a right dihedrally grooved pyramid and the external surface enclosing this pyramid has a system of dihedral grooving 57 extending entirely around each projection.

In all of these systems of dihedral grooving formed in a reflecting and refracting medium such as glass, the grooved surface reflects a beam of incident light reversely substantially in the plane of incidence, the rays traversing the glass and emerging substantially parallel and in such a way as to increase the total angle of aspect of the optical system. The majority of the rays striking the forty-five or ninety degree grooved system and are totally reflected making it unnecessary to coat the reflecting surfaces with reflecting material.

Thus reflector units are made up in various sizes or shapes with reflecting projections formed with one or more of the systems of dihedral grooving to increase the reflection and refraction of the unit, to widen the angle of aspect of the incident and reflected rays, and to produce reflector units which may be combined with other units to form signs, pictures, displays and the like. The sizes of the projections on which the dihedral grooving is provided will depend upon the sizes of the units themselves but even for very small projections the grooving may be effectively applied in various forms which will make a much more effective reflecting unit without the necessity of any reflecting material.

I claim:

1. In a collinear reflector, a unit comprising a plane surface on one side and a plurality of separate reflector projections at the other side, each projection comprising a paraboloid reflecting surface truncated in the plane of the latus rectum of the paraboloid and the end including a convex spherical surface having its axis coincident with that of the paraboloid, one of said surfaces having a closely spaced system of dihedral grooving covering it.

2. In a collinear reflector, a unit comprising a plurality of separate reflector projections at one side and a plane reflecting surface at the other side, each projection being of solid transparent refractive material and having a paraboloidal reflecting side surface and an outwardly curved end spherical surface whose vertex is coincident with the axial focal point of the said paraboloid, and a closely spaced system of dihedral grooving entirely covering one of said surfaces.

3. In a collinear reflector, a unit having a plurality of separate projections at one side, each unit having an outer paraboloidal reflecting surface truncated in the plane of the latus rectum and a convexly rounded end surface, said surface beyond the plane of truncation containing a system of radial ninety degree dihedral grooves for increasing the total aspect of the separate projections.

4. In a collinear reflector, a unit comprising a plurality of separate projections each having a paraboloidal reflecting surface and backed with an outwardly curved spherical surface whose vertex is co-incident with the axial focal point of the paraboloidal surface, said back spherical surface containing a system of radial dihedral grooves for increasing the total angle of aspect of the separate units.

5. In a collinear reflector, according to claim 4, each unit originally comprising a circular body flat on the side opposite the projections and the circular edges being trimmed to provide a regular angular shape adapted to be combined with other units of the same shape to make up a continuous reflecting surface made of many contiguous units.

6. In a collinear reflector, a solid unit of transparent refracting material having a paraboloidal side surface with a convex, concentric curved end surface, the curved end surface containing a system of close spaced dihedral reflecting and refracting projections.

ARTHUR F. ECKEL.